United States Patent [19]

Bedrosian

[11] 4,451,013
[45] May 29, 1984

[54] TELEPHONE CABLE REEL

[75] Inventor: Elliot P. Bedrosian, Sterling, Va.

[73] Assignee: Siecor Corporation, Hickory, N.C.

[21] Appl. No.: 434,836

[22] Filed: Oct. 18, 1982

[51] Int. Cl.³ .............................................. B65H 75/14
[52] U.S. Cl. ................................. 242/118.4; 191/12.4
[58] Field of Search ...................... 242/118.4, 118, 117, 242/107, 54 A; 191/12.4; 254/186

[56] References Cited

U.S. PATENT DOCUMENTS

| | | | |
|---|---|---|---|
| 1,863,341 | 6/1932 | Jensen | 191/12.4 |
| 3,582,011 | 6/1971 | Murray | 242/117 |
| 3,784,166 | 1/1974 | Renfroe | 254/186 |

Primary Examiner—Leonard D. Christian
Attorney, Agent, or Firm—Roy B. Moffitt

[57] ABSTRACT

A cable reel adapted for use with telephone cable, at least one end of which has been "pre-connectorized." The reel has first and second spaced apart upstanding flanges attached one to another by a cylindrically shaped cross member. Inside of the cross member is a cable terminating receiving means adapted to receive an end or terminal portion of a telephone cable that has been "pre-connectorized." An aperture in the cross member aligned with cable terminating receiving means permits access thereto.

5 Claims, 5 Drawing Figures

TELEPHONE CABLE REEL

BACKGROUND OF THE INVENTION

The present invention relates to reels on which telephone cable, containing insulated metallic (copper) or glass conductors, are wound in preparation for either storage, shipment or both. Recently, there has been an innovation introduced by suppliers of telephone cable referred to in the industry as "pre-con" cable or "pre-connectorized" cable. Pre-connectorized or pre-con cable is cable that has a predetermined number of connector modules connected to a predetermined number of insulated electrical conductors at one or more terminal ends of the cable. The modules are of either male or female type and are easily fitted into a module of opposite gender of another cable, thereby completing an electrical path from the conductors of one cable to the conductors of another cable.

A single module may be capable of terminating a multiplicity of conductors of a given cable and when it is "snap fitted" into mating relationship with another module of a given cable, also terminating a like number of conductors an electrical path is created between the first and second conductors and the two cables. As it is known in the prior art, pre-con cable is used primarily in situations where rapid splicing of one conductor to another is desirable, e.g., in underground or duct works. Splicing in such an environment usually, but not always, involves a cable having a pulling eye at one cable end and the conductors of the opposite end pre-connectorized. The pulling eye is used to pull the cable through duct work; thus, any reel of cable reaching a construction site must have the pulling eye on top, i.e. exposed. Such an arrangement logically causes the pre-con end to be "on the bottom" so to speak, i.e., it is the last to come off the reel. In order to achieve this end, pre-con cable wound on a prior art reel required that the cross member of the reel (the portion of the reel the cable was actually would upon) be divided by an elongated member affixed perpendicular to the longitudinal axis of the cross member. Such an arrangement divided the reel cross member into two portions, one portion reserved exclusively for the terminal portion containing the pre-connectorized modules and the other portion for the balance of the cable and the pulling eye portion.

Prior art reels of the above described nature had one serious drawback: they were restricted in the amount of cable the reel could carry. No cable could be wound on top of the pre-con terminal portion for fear of damaging the modules. Thus, for practical purposes, that portion of the cable reel cross member reserved for the pre-con terminal portion was used exclusively for such; thereby reducing the amount of cable that could be wound on a given cable reel compared to amount of cable the reel could otherwise accommodate absent a pre-con cable end.

BRIEF DESCRIPTION OF THE INVENTION

The present invention is a cable reel designed to solve the preconnectorized cable problem referred to above. An increased amount of cable (30 to 40 percent) can be wound on a cable reel of the present invention in comparison to prior art cable reels. The disclosed reel comprises first and second spaced apart upstanding flanges, connected together by a cylindrical shaped cross member, which is the member upon which the cable is to be wound. Inside of the cross member is a disc shaped support means spaced apart from both of the flanges. Between one of the flanges and the disc shaped support means is a cable terminal receiving means (basically a device having a cavity therein) supported by the support means and one of the flanges, usually a tube like member. The cross member has an aperture in it in line with the cavity of the cable terminal receiving means so that the pre-con end of a cable can be inserted into the cavity of such means. Then the cable is wound over the entire surface and onto itself up to the terminal edges of the flanges. In this fashion the pulling eye of the cable is on top (comes off first) and the pre-con end is on the bottom and comes off last, all in the desired order. For a given pair count telephone cable, between 30 to 40 percent more cable, compared to prior art cable reels, can be wound on the reel of the instant invention.

The foregoing and other features and advantages of the present invention will be apparent to those skilled in the art from the following detailed description taken in combination with the accompanying drawings in which.

DETAILED DESCRIPTION OF INVENTION

Figure 2:
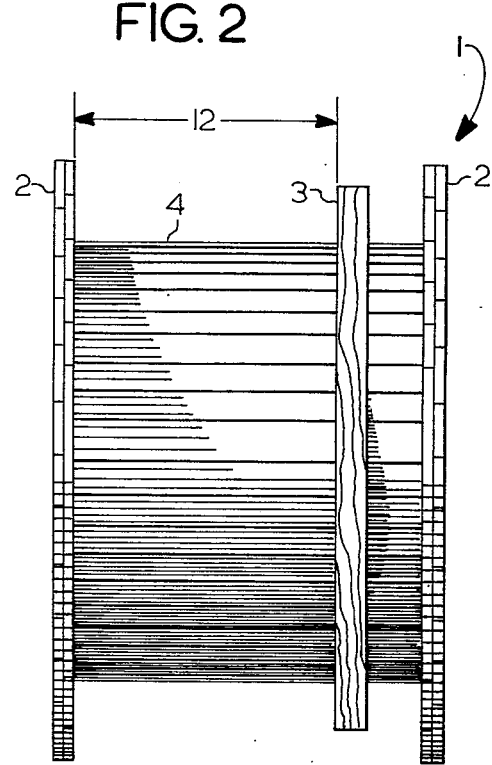
FIG. 2 is a front elevation of a prior art reel without the pre-connectorized cable wound thereon.
Figure 4:
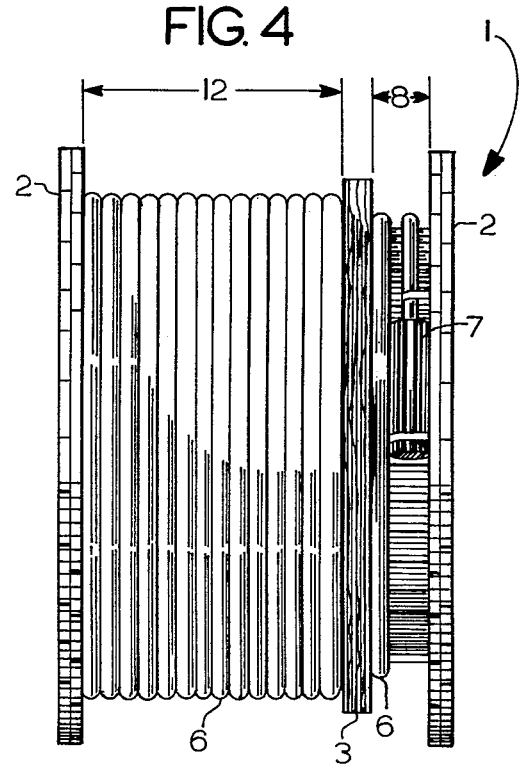
FIG. 4 is a front elevation of a prior art cable reel with cable having a pre-con terminal portion wound thereon.
Figure 5:
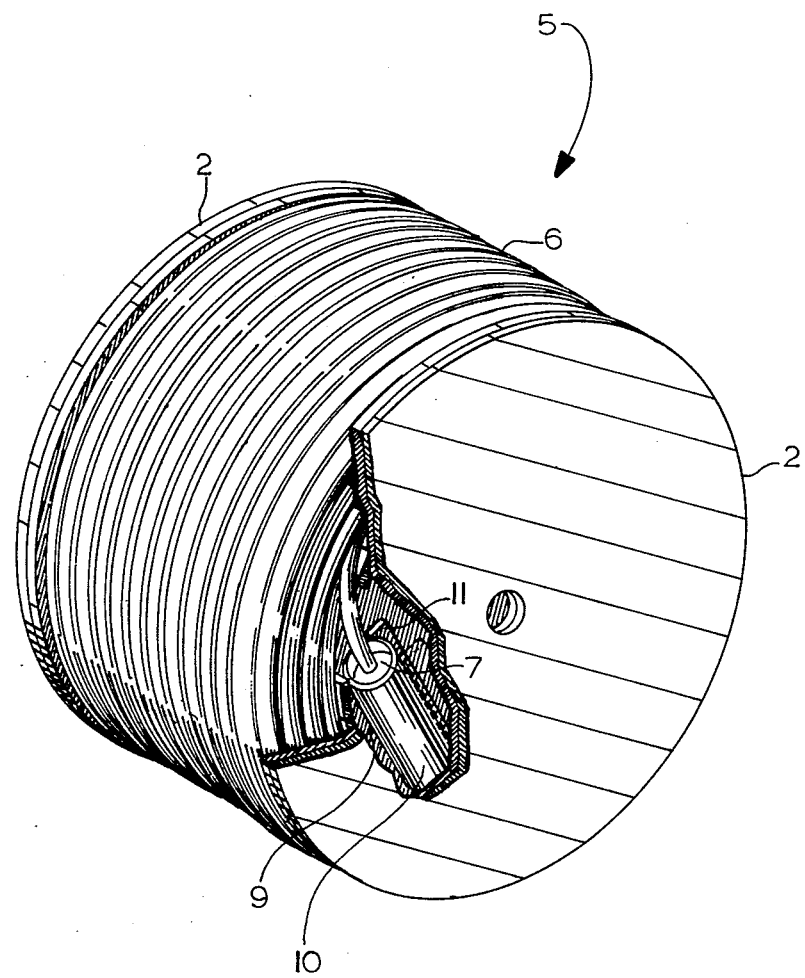
FIG. 5 is a perspective view of the instant invention with a cut-away portion showing a receptacle or receiving means for a pre-connectorized terminal portion of a telecommunications cable.

Prior art as relating to reels upon which pre-connectorized telecommunications cable is wound and shown in FIGS. 2 and 4. Reel 1 is composed of flanges 2 and cross member 4. Element 3 is a board affixed by nails or other means to cross member 4 to divide cross member 4 in the two areas, one shown by element 8 and the other shown by element 12. In area 8 a terminal portion of cable 6 is affixed to cross member 4, such terminal portion being shown by the element 7. This element represents a case or some type of enclosure into which the pre-connectorized conductors (not shown) are disposed. After affixing case 7 to cross member 4, cable 6 is thereafter wound on the cross member 4, only one course being permitted in area 8 in comparison to area 12 where the cable can be wound upon itself up to the terminal edges of the flanges 2. This permits a pulling eye (not shown) to be disposed on the terminal portion opposite from that terminal portion represented by element 7.

Figure 1:
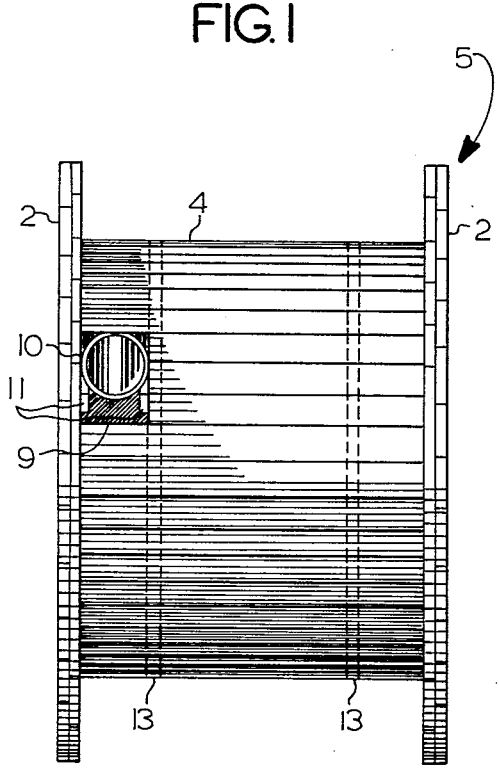
FIG. 1 is a front elevation of the reel of the instant invention.
Figure 3:
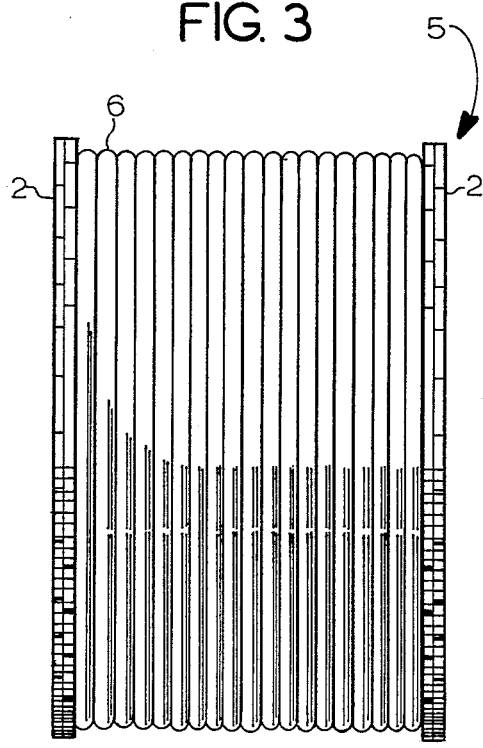
FIG. 3 is a front elevation of the reel of the instant invention showing pre-con telephone cable wound on the reel.

Referring to FIGS. 1 and 3, the cable reel of the instant invention involves cross member 4 connected to flanges 2. Flanges 2 are made up of a composite of wooden members affixed one to another to form a laminate and cross member 4 is made up of a plurality of boards affixed to support means 13. These last mentioned support means are disc shaped members disposed inside of cylindrical shaped cross member 4. Aperture 9 is provided in cross member 4 as shown in FIG. 1 and inside of cross member 4 in alignment with aperture 9 is a receiving means 10 adapted to receive element 7 of FIG. 4. Receiving means 10 is disposed upon support members 11, one of which is attached to flange 2 and the other is attached to support means 13.

In FIG. 1 case 7 containing the pre-connectorized terminal portion of cable 6 is disposed inside of receiving means 10 and after this simple task has been completed, the balance of cable 6 is wound upon the reel 5 in the customary fashion up to the terminal edges of flanges 2.

As previously stated, depending upon the given cable size, 30 to 40 percent more cable can be wound on cable reel 5 (of the instant invention) as compared to pre-connectorized cable found on reels of the prior art, namely reel 1. Case 7 disposed in receiving means 10 inside of cross member 4 permits case 7 to "come off of the reel last" and further permits the terminal portion of cable 6 containing pulling eye (not shown) to "come off the reel first." Such an arrangement allows for a given length of cable to be pulled into a conduit in expeditious fashion. This cable is then ready to be spliced to another terminal portion of another pre-connectorized cable, having opposite gender modules.

In the drawings and specification, there has been set forth a preferred embodiment of this invention and, although specific terms are employed, these are used in a generic and descriptive sense only only and not for purposes of limitation, the scope of the invention being defined in the claims.

We claim:

1. A cable reel comprising:
   (a) first and second spaced apart upstanding flanges;
   (b) a cylindrical shaped cross member, a terminal portion of one end of said cross member attached to said first flange and the terminal portion of the other end attached to the second flange;
   (c) a disc shaped support means disposed inside of said cross member and spaced apart from said first flange;
   (d) a cable terminal receiving means comprising a container adapted to receive a pre-connectorized terminal portion of a cable, said container having at least one opening therein, said opening facing the cylindrical shaped cross member; and,
   (e) an aperture in said cylindrically shaped cross member aligned with the opening in said container, the size of said aperture being at least as large as the opening of said container.

2. The cable reel of claim 1 containing a first support means attached to the innermost surface of said first flange and a second support means affixed to the surface of said disc shaped support means facing the innermost surface of said first flange.

3. The cable reel of claim 2 wherein said cable terminals receiving means is a cylinder and is parallel to said support means.

4. The cable reel of claim 1 wherein said first and second spaced apart flanges are circular and larger in diameter than said cylindrical cross member.

5. The cable reel of claim 1 containing an additional disc shaped support means disposed inside of the cross member disposed between the first mentioned disc shaped support means and said second flange.

* * * * *